United States Patent [19]

Talmy et al.

[11] Patent Number: 5,641,440

[45] Date of Patent: Jun. 24, 1997

[54] SINTERING AIDS FOR PRODUCING $BaO \cdot Al_2O_3 \cdot 2SiO_2$ AND $SrO \cdot Al_2O_3 \cdot 2SiO_2$ CERAMIC MATERIALS

[75] Inventors: Inna G. Talmy, Silver Spring; James A. Zaykoski, Beltsville, both of Md.

[73] Assignee: The United States of America as represented by the Secretary of the Navy, Washington, D.C.

[21] Appl. No.: 521,384

[22] Filed: Jul. 26, 1995

[51] Int. Cl.$^6$ .......................... C04B 33/34; C04B 33/36; C04B 35/03; C03C 1/00
[52] U.S. Cl. .......................... 264/681; 501/32; 501/128
[58] Field of Search ...................... 264/60; 501/32, 501/128

[56] References Cited

U.S. PATENT DOCUMENTS

| | | | |
|---|---|---|---|
| 4,525,464 | 6/1985 | Claussen et al. | 501/103 |
| 4,552,852 | 11/1985 | Manning | 501/105 |
| 4,711,860 | 12/1987 | Gadkaree et al. | 501/32 |
| 4,766,096 | 8/1988 | Layden et al. | 501/32 |
| 4,911,902 | 3/1990 | Talmy et al. | 423/328 |
| 4,973,564 | 11/1990 | Chyung et al. | 501/32 |
| 4,994,419 | 2/1991 | Talmy et al. | 501/125 |
| 5,023,207 | 6/1991 | MacDowell | 501/8 |
| 5,041,400 | 8/1991 | Talmy et al. | 501/125 |
| 5,132,178 | 7/1992 | Chyung et al. | 501/32 |
| 5,132,254 | 7/1992 | Stempin et al. | 501/32 |
| 5,132,257 | 7/1992 | Kodama et al. | 501/32 |
| 5,221,645 | 6/1993 | Drouot et al. | 501/32 |
| 5,281,559 | 1/1994 | Bansal | 501/8 |
| 5,538,925 | 7/1996 | Talmy et al. | 501/8 |

OTHER PUBLICATIONS

Document Number 08623765 Date Mar. 29, 1996 Name Talmy et al. (Application).

*Primary Examiner*—Donald E. Czaja
*Assistant Examiner*—Jacqueline A. Ruller
*Attorney, Agent, or Firm*—John Forrest; Roger D. Johnson

[57] ABSTRACT

A glass which contains (1) an alkaline earth oxide that is BaO, SrO, or mixtures thereof, (2) $Al_2O_3$, and (3) $SiO_2$. The glass is useful as a sintering aid in the preparation of monoclinic $BaO \cdot Al_2O_3 \cdot 2SiO_2$ or monoclinic $SrO \cdot Al_2O_3 \cdot 2SiO_2$ ceramic structures.

13 Claims, No Drawings

SINTERING AIDS FOR PRODUCING $BaO \cdot Al_2O_3 \cdot 2SiO_2$ AND $SrO \cdot Al_2O_3 \cdot 2SiO_2$ CERAMIC MATERIALS

BACKGROUND OF THE INVENTION

This invention relates to ceramic materials and more particularly to aluminosilicate ceramic materials.

Ceramics based on monoclinic $BaO \cdot Al_2O_3 \cdot 2SiO_2$ (celsian, BAS), monoclinic $SrO \cdot Al_2O_3 \cdot 2SiO_2$ (SAS), or mixture there of are attracting considerable interest for a variety of applications due to their unique combination of high refractoriness, low thermal expansion, low dielectric constant and loss tangent both stable over a broad range of temperatures and frequencies. Dielectric ceramics, electronic packaging, and structural ceramics are all possible applications for BAS, SAS, or mixture there of.

Celsian exists in two main crystalline modifications: monoclinic, stable up to 1590° C. and hexagonal, stable from 1590° C. to the melting temperature (1760° C.). Even though the hexagonal modification (hexacelsian) is the high temperature modification, it tends to be the first product of synthesis (solid- and gaseous-state reactions, melt crystallization, sol-gel process, and oxidation of metals) and persists metastably throughout the whole temperature range. Hexacelsian reversibly transforms at 300° C. into the low temperature orthorhombic modification. This transformation is accompanied by a significant volume change making hexacelsian unsuitable for high-temperature thermal cycling applications. Transformation of hexagonal celsian into the desirable monoclinic form is promoted by prolonged high-temperature heating, hydrothermal treatment, and by the presence of impurities or the addition of certain additives (such as $B_2O_3$, LiF, $Cr_2O_3$, $ZrSiO_3$). The additives or impurities can adversely affect all properties of the ceramics, particularly their dielectric behavior and high-temperature mechanical properties.

Strontium aluminosilicate (SAS) with a melting point of 1710° C. exhibits similar polymorphism. Formation of SAS by solid phase reaction is also characterized by the primary appearance of a metastable hexagonal form. However, contrary to hexagonal BAS, the hexagonal phase of SAS is very unstable and the preparation of monoclinic SAS does not pose any problem. A minimum process temperature of 1550° C. is needed to produce these ceramic materials. It would be desirable for economic reasons to reduce the minimum ceramic process temperature. The monoclinic BAS, SAS, or BAS/SAS ceramic material firing temperature might be reduced by using sintering aids. However, conventional sintering aids can destroy the mechanical and dielectric properties of the final ceramic material.

SUMMARY

Accordingly, an object of this invention is to provide a new lower temperature process for preparing dense monoclinic $BaO \cdot Al_2O_3 \cdot 2SiO_2$ (BAS; celsian), monoclinic $SrO \cdot Al_2O_3 \cdot 2SiO_2$ (SAS), or monoclinic BAS/SAS solid solution ceramic materials.

Another object of this invention is to provide new sintering aids suitable for producing high strength, low dielectric ceramic materials from BAS, SAS, or mixtures thereof.

These and other objects of this invention are accomplished by providing a sintering aid that is a homogenous glass containing (1) from 14 to 45 mole percent of an alkaline earth oxide that is BaO, SrO, or mixtures of BaO and SrO;

(2) from 8 to 16 weight percent of $Al_2O_3$; and (3) the remainder of the glass being $SiO_2$.

The homogeneous glass when mixed as a powder with monoclinic BAS powder, monoclinic SAS powder, or mixture of monoclinic BAS and SAS powders reduces the firing temperature required to produce a fully densified ceramic material.

DESCRIPTION

The sintering aids of this invention are glasses comprising (1) an alkaline earth oxide that is BaO, SrO, or mixtures of BaO and SrO, (2) alumina ($Al_2O_3$), and (3) silicon dioxide ($SiO_2$). The $Al_2O_3$ preferably comprises from about 8 to about 16, more preferably from 9 to 12, and still more preferably from 10 to 11 weight percent of the glass. The quantity of BaO, SrO, or mixtures thereof are expressed in mole percent because SrO is substituted for BaO on a molar rather than a weight basis. Preferably BaO, SrO, or mixtures of BaO and SrO comprise from about 14 to about 45 mole percent of the glass. For the low melting glasses the BaO, SrO, or mixtures of BaO and SrO comprise more preferably from 14 to 30, still more preferably from 14 to 20, and most preferably from 14 to 17 mole percent of the glass. For the higher melting glasses the BaO, SrO, or mixtures of BaO and SrO more preferably comprise from 35 to 40 and still more preferably from 37 to 38 mole percent of the glass. The silicon dioxide $SiO_2$ comprises the remainder of the glass. In other words, the amount of $SiO_2$ is dictated by the weight percent of $Al_2O_3$ in combination with the mole percent of BaO, SrO or mixtures thereof. Examples 4 through 7 illustrate the preparation of the high and low temperature barium and strontium aluminosilicate glasses. Barium carbonate ($BaCO_3$) and strontium carbonate ($SrCO_3$) were used as the sources of BaO and SrO. During the heating process $BaCO_3$ and $SrCO_3$ decompose to give BaO and SrO and carbon dioxide ($CO_2$). Of course, the amounts of $BaCO_3$ and $SrCO_3$ used are calculated to provide the desired molar percentages of BaO and SrO in the molten glass mixture.

The mixture of powders of (1) the alkaline earth oxide precursors ($BaCO_3$, $SrCO_3$, or mixtures of $BaCO_3$ and $SrCO_3$), (2) $Al_2O_3$, and (3) $SiO_2$ is preferably heated to a temperature that is about 100° C. above the melting point of the glass to be produced. For example, 10 weight percent of $Al_2O_3$, 37.5 mole percent of BaO, and the rest of the mixture being $SiO_2$ will produce a glass having a melting point of 1320° C. The powder mixture would preferably be heated at 1420° C. A more general procedure, that works for any of the glass composites of this invention, is to heat the glass precursor ingredients at 1500° C. After the melt is formed, the heating is continued until the melt is homogenized. In the examples, the material was heated about 8 hours to be sure the melt was homogenized. The homogenized melt is quenched in water to avoid or minimize crystallization and produce the glass. The glass is ground to form a powder suitable for mixing with the monoclinic $BaO \cdot Al_2O_3 \cdot 2SiO_2$ powder, monoclinic $SrO \cdot Al_2O_3 \cdot 2SiO_2$ powder or mixtures thereof. In the examples, the glass powder was screened to have particles less than 40 microns in size. Because the barium or strontium glasses are sintering aids which melt during the process, the glass particle size is not critical.

This sintering aid glass is useful in reducing the temperatures needed to produce monoclinic ceramic materials from monoclinic $BaO_2 \cdot Al_2O_3 \cdot 2SiO_2$ (BAS, celsian), $SrO_2 \cdot Al_2O_3 \cdot 2SiO_2$ (SAS), or mixtures of BAS and SAS. An intimate mixture of powdered sintering aid glass with BAS powder, SAS powder, or mixtures of BAS and SAS powders is fired to produce the ceramic material.

The monoclinic $BaO.Al_2O_3.2SiO_2$ starting material can be prepared without seed crystals according to example 1. This monoclinic $BaO.Al_2O_3.2SiO_2$ is then used as seed crystals in the much easier process of example 2 to produced more monoclinic $BaO.Al_2O_3.2SiO_2$. The monoclinic $BaO.Al_2O_3.2SiO_2$ produced in example 2 can be used as seed crystals for further batches. The monoclinic $SrO.Al_2O_3.2SiO_2$ can be produced according to the process of example 3. The monoclinic $BaO.Al_2O_3.2SiO_2$ and the monoclinic $SrO.Al_2O_3.2SiO_2$ are each ground into very fine powders. These powders will preferably have a surface area of from 3 to 6 $m^2/g$ and more preferably of from 4 to 5.5 $m^2/g$.

In use, the alkaline earth aluminosilicate glass powder sintering aid is mixed intimately and uniformly with (1) monoclinic $BaO.Al_2O_3.2SiO_2$ (BAS, celsian) powder, (2) monoclinic $SrO.Al_2O_3.2SiO_2$ (SAS) powder, or (3) a mixture of from more than zero to less than 100 weight percent monoclinic SAS powder with the remainder of the mixture being monoclinic BAS powder to form a raw ceramic powder mixture. The alkaline earth aluminosilicate glass will preferably comprise from about 15 to about 35, more preferably from 20 to 30, and still more preferably from 24 to 26 weight percent of the raw mixture with monoclinic BAS, monoclinic SAS, or a mixture of monoclinic BAS and SAS comprising the remainder of the raw ceramic powder mixture.

Next, the raw ceramic powder mixture is cold formed into a green body of the desired size and shape. Cold die pressing may be used for the simpler shapes. For more complex shapes cold isostatic pressing (CIP) may be used. In the examples, the raw ceramic powder mixtures were die pressed at 100 MPa.

The green body is then fired. Note, if monoclinic BAS powder is used alone, a firing temperature of 1580° C. is required for full densification. This firing temperature is very close to the monoclinic to hexagonal BAS transformation temperature of 1590° C., which can lead to the back transformation of monoclinic celsian into hexagonal form and thus result in the presence of undesirable hexagonal celsian in the final ceramics. If a mixture of 25 weight percent of high temperature barium aluminosilicate glass powder and 75 weight percent of monoclinic BAS powder is used, firing at 1400° C. produces a fully densified ceramic product. Similarly, if a mixture of 25 weight percent of high temperature strontium aluminosilicate glass powder and 75 weight percent of monoclinic BAS powder is used, firing at 1300° C. produces a fully densified ceramic product.

For raw mixtures of monoclinic BAS, monoclinic SAS, or mixtures thereof with strontium aluminosilicate glass, the firing temperature is preferably in the range of from about 1300° C. to 1550° C., more preferably about 1300° C. to 1450° C., and still more preferably 1300° C. to 1375° C. For raw mixtures of monoclinic BAS, monoclinic SAS, or mixtures thereof with either barium aluminosilicate glass or a mixed barium strontium aluminosilicate glass, the firing temperature is preferably from about 1400° C. to 1550° C., more preferably from about 1400° C. to 1500° C., and still more preferably from 1400° C. to 1450° C. Firing times of from about 3 to about 5 hours work well.

After firing, the resulting sintered ceramics is slowly oven cooled to room temperature. The ceramics is preferably cooled at a rate of from about 1° C. to about 5° C. per minute or more preferably 1° C. to 3° C. per minute. During this cooling, the molten glass crystallizes producing monoclinic $BaO.Al_2O_3.2SiO_2$ (BAS), monoclinic $SrO.Al_2O_3.2SiO_2$ (SAS), or mixtures thereof. Depending on the glass composition, other crystallization product may include: $3Al_2O_3.2SiO_2$, $Al_2O_3$, $SiO_2$, $BaO.SiO_2$, $2BaO.SiO_2$, $BaO.2SiO_2$, $BaO.6Al_2O_3$, $BaO.Al_2O_3$, $3BaO.Al_2O_3$, $SrO.SiO_2$, $2SrO.SiO_2$, $SrO.2SiO_2$, $SrO.6Al_2O_3$, $SrO.Al_2O_3$, $3SrO.Al_2O_3$, etc. These other crystallization products will be present in small amounts and as a result do not adversely affect the dielectric properties of the ceramics. The recrystallization products have melting points above 1600° C. and will not deteriorate the high temperature mechanical properties of final ceramics.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

Preparation of Monoclinic $BaO.Al_2O_3.2SiO_2$ without Seed Crystals

A uniform, stoichiometric, raw powder mixture of $BaCO_3$, $Al_2O_3$, and fused $SiO_2$ was prepared. (Any conventional mixing techniques can be used for the preparation of the raw powder mixture.) The powder was pressed into pellets at 100 MPa and then fired at 1500° C. for about 150 hours. The product was monoclinic $BaO.Al_2O_3.2SiO_2$. It was ground to a particle size less than 60 microns for use as seeds in example 2.

EXAMPLE 2

Preparation of Monoclinic $BaO.Al_2O_3.2SiO_2$ Using Monoclinic Seeds

Into a uniform, stoichiometric, raw powder mixture of $BaCO_3$, $Al_2O_3$ (0.3 microns), and fused $SiO_2$ was added the monoclinic $BaO.Al_2O_3.2SiO_2$ seed crystals (less than 60 microns in size) prepared in example 1. Batches containing 1, 3, 5, and 10 percent by weight of the monoclinic $BaO.Al_2O_3.2SiO_2$ seed crystals were prepared and then fired at 1250°–1500° C. for 5 hours. The addition of monoclinic seeds highly intensified the formation of monoclinic $BaO.Al_2O_3.2SiO_2$. Even the presence of 1 percent seeds significantly promoted the phase transformation from hexagonal to monoclinic $BaO.Al_2O_3.2SiO_2$ at 1250° C. Total phase transformation was accomplished by the addition of at least 5 percent by weight of the monoclinic $BaO.Al_2O_3.2SiO_2$ seed crystals. This was demonstrated by the batches containing 5 and 10 percent by weight of the seed crystals. Note that the completely transformed, 100 percent monoclinic $BaO.Al_2O_3.2SiO_2$ product can be ground to particles less than 60 microns in size and used as seed crystals for subsequent batches. In other words, the process of example 1 is needed only to prepare an initial batch of monoclinic $BaO.Al_2O_3.2SiO_2$.

EXAMPLE 3

Preparation of Monoclinic $SrO.Al_2O_3.2SiO_2$

A uniform, stoichiometric, raw powder mixture of $SrCO_3$, $Al_2O_3$, and fused $SiO_2$ was prepared. The raw powder mixture was pressed into pellets at 100 MPa and then fired at 1050°–1400° C. for 5 hours. X-ray diffractograms showed that the reaction was practically complete at 1300° C. and the product consisted only of monoclinic $SrO.Al_2O_3.2SiO_2$.

In 4 through 7 examples, the BaO component is added to the starting material mixtures as $BaCO_3$ and the SrO component is added as $SrCO_3$. During the firing the carbonates decompose to the corresponding oxides. For each gram of BaO needed, 1.2870 grams of $BaCO_3$ are used. Similarly, for each gram of SrO needed, 1.4247 grams of $SrCO_3$ are used.

EXAMPLE 4

Preparation of High Temperature Barium Aluminosilicate Glass

A barium aluminosilicate glass having the composition of 58 weight percent (37.5 mole percent) BaO, 10 weight percent $Al_2O_3$, and 32 weight percent $SiO_2$ was prepared from a uniform, raw powder mixture of the right proportions of $BaCO_3$, $Al_2O_3$, and fused $SiO_2$. The mixture was heated for 8 hours at 1500° C. in and the molten mixture was then water quenched to room temperature. The resulting glass was ground and screened to produce a powder having particles less than 40 microns in size. This glass having a composition of 37.5 mole percent BaO, 10 weight percent $Al_2O_3$, the remaining being $SiO_2$ and a melting point of 1320° C. is referred to as the high temperature barium aluminosilicate glass.

EXAMPLE 5

Preparation of Low Temperature Barium Aluminosilicate Glass

The process of Example 4 was repeated with the ratio of ingredients changed to produce a glass having a composition of 14 mole percent BaO, 10 weight percent $Al_2O_3$ with the remainder being $SiO_2$ and a melting point of about 1200° C. This glass composition is designated the low temperature barium aluminosilicate glass.

EXAMPLE 6

Preparation of High Temperature Strontium Aluminosilicate Glass

The process of example 4 was repeated except that $SrCO_3$ was substituted for the $BaCO_3$ to produce a high temperature strontium aluminosilicate glass having a composition of 37.5 mole percent SrO, 10 weight percent $Al_2O_3$, the remainder of the glass being $SiO_2$. This glass is called the high temperature strontium aluminosilicate glass.

EXAMPLE 7

Preparation of Low Temperature Strontium Aluminosilicate Glass

The process of example 5 was repeated except that $SrCO_3$ was substituted for $BaCO_3$ to produce a low temperature strontium aluminosilicate glass having a composition of 14 mole percent SrO, 10 weight percent $Al_2O_3$, the remainder of the glass being $SiO_2$. This glass is called the low temperature eutectic strontium aluminosilicate glass.

Examples 8 and 9 illustrate the use of barium aluminosilicate glass and strontium aluminosilicate glass as sinter aids.

EXAMPLE 8

A uniform, intimate mixture of 75 weight percent of monoclinic $BaO.Al_2O_3.2SiO_2$ powder having a surface area of nearly 5 $m^2/g$ and 25 weight percent of high temperature barium aluminosilicate glass powder [37.5 mole percent (58 weight percent) BaO, 10 weight percent $Al_2O_3$, and 32 weight percent $SiO_2$; particle size less than 40 microns] was pressed at 100 MPa into 5×5×60 mm bars. The bars were fired at 1400° C. for 5 hours, and then slowly oven cooled to room temperature. The resulting product was fully densified bars of monoclinic $BaO.Al_2O_3.2SiO_2$ and small amounts of barium oxide silicate ($BaO.SiO_2$).

EXAMPLE 9

A uniform intimate mixture of 75 weight percent of monoclinic $BaO.Al_2O_3.2SiO_2$ powder having a surface area of nearly 5 $m^2/g$ and 25 weight percent of a high temperature strontium aluminosilicate glass powder (37.5 mole percent SrO, 10 weight percent $Al_2O_3$, the remainder SiO; particle size less than 40 microns) was pressed at 100 MPa into 5×5×60 mm bars. The bars were fired at 1300° C. for 3 hours and then slowly oven cool to room temperature. The resulting product was fully densified bars of ceramic material containing monoclinic $BaO.Al_2O_3.2SiO_2$ and monoclinic $SrO.Al_2O_3.2SiO_2$ solid solution and small amounts of barium oxide silicate ($BaO.SiO_2$) and strontium oxide silicate ($SrO.SiO_2$).

Obviously, other modifications and variations of the present invention may be possible in light of the foregoing teachings. it is therefore to be understood that within the scope of the appended claims the invention may be practiced otherwise than as specifically described.

What is claimed is:

1. A pressureless sintering process for producing a ceramic structure comprising:
   A. forming a uniform, raw ceramic powder mixture of
      (1) from about 65 to about 85 weight percent of an alkaline earth oxide aluminosilicate powder selected from the group consisting of monoclinic $BaO.Al_2O_3.2SiO_2$, monoclinic $SrO.Al_2O_3.2SiO_2$, and mixtures thereof; and
      (2) a glass powder being the remainder of the uniform powder mixture wherein the glass consists essentially of
         (a) from about 8 to about 16 weight percent of $Al_2O_3$;
         (b) from about 14 to about 45 mole percent of an alkaline earth oxide selected from the group consisting of BaO, SrO, and mixtures thereof; and
         (c) $SiO_2$ being the remainder of the glass;
   B. forming the raw ceramic powder mixture into a green body;
   C. firing the green body at from zero pressure to atmospheric pressure and a temperature in the range of from about 1300° C. to 1550° C. if the glass is made from SrO but in the range of from about 1400° C. to 1550° C. if the glass is made from either BaO or a mixture of BaO and SrO until the body is sintered and densified; and
   D. allowing the sintered body to slowly cool to room temperature during which recrystallization products are formed from the molten glass.

2. The process of claim 1 wherein the glass was made from SrO, $Al_2O_3$, and $SiO_2$ and the firing temperature in step C is from about 1300° C. to 1450° C.

3. The process of claim 2 wherein the firing temperature in step C is from 1300° C. to 1375° C.

4. The process of claim 1 wherein the glass is made from (1) BaO or a mixture of BaO and SrO as well as (2) $Al_2O_3$ and (3) $SiO_2$ and the firing temperature in step C is from about 1400° C. to 1500° C.

5. The process of claim 4 wherein the firing temperature in step C is from 1400° C. to 1450° C.

6. The process of claim 1 wherein the sintered body is cooled in step D at a rate of from about 1° C. to about 5° C. per minute.

7. The process of claim 6 wherein the sintered body is cooled in step D at a rate of from 1° C. to 3° C. per minute.

8. The process of claim 1 wherein the alkaline earth oxide aluminosilicate comprises from 70 to 80 weight percent of the raw ceramic mixture.

9. The process of claim 1 wherein $Al_2O_3$ is from 9 to 12 weight percent of the glass.

10. The process of claim 1 wherein the alkaline earth oxide is from 14 to 20 mole percent of the glass.

11. The process of claim 1 wherein the alkaline earth oxide is from 35 to 40 mole percent of the glass.

12. The process of claim 1 wherein the green body is fired at atmospheric pressure.

13. The process of claim 1 wherein the green body is fired in a vacuum.

* * * * *